(12) United States Patent
Kim et al.

(10) Patent No.: US 7,048,780 B2
(45) Date of Patent: May 23, 2006

(54) AIR PURIFIER

(75) Inventors: Young-Saeng Kim, Incheon (KR); Chan-Jung Park, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 10/452,152

(22) Filed: Jun. 3, 2003

(65) Prior Publication Data

US 2004/0118277 A1    Jun. 24, 2004

(30) Foreign Application Priority Data

Dec. 23, 2002   (KR)   ...................... 10-2002-0082686

(51) Int. Cl.
*B03C 3/06*    (2006.01)
(52) U.S. Cl. .................. 95/78; 55/DIG. 38; 96/84; 96/95; 96/96; 96/100
(58) Field of Classification Search .................. 96/67, 96/84, 86, 87, 95, 96, 100; 95/78; 55/DIG. 38
See application file for complete search history.

(56) References Cited

U.S. PATENT DOCUMENTS

| | | | | |
|---|---|---|---|---|
| 1,356,462 A | * | 10/1920 | Nesbit ............................ | 96/87 |
| 1,357,202 A | * | 10/1920 | Nesbit ............................ | 96/75 |
| 2,588,111 A | * | 3/1952 | Hanneman .................... | 204/668 |
| 2,997,519 A | * | 8/1961 | Hines et al. .................... | 174/28 |
| 3,237,382 A | * | 3/1966 | Berly ............................. | 96/67 |
| 4,354,858 A | * | 10/1982 | Kumar et al. .................. | 95/78 |
| 4,509,958 A | * | 4/1985 | Masuda et al. ................ | 96/60 |
| 4,781,736 A | * | 11/1988 | Cheney et al. ................ | 96/60 |
| 5,547,493 A | * | 8/1996 | Krigmont ...................... | 96/54 |
| 5,647,890 A | * | 7/1997 | Yamamoto .................... | 95/69 |
| 5,938,818 A | * | 8/1999 | Miller ........................... | 95/63 |
| 6,294,003 B1 | * | 9/2001 | Ray ............................... | 96/49 |
| 6,482,253 B1 | * | 11/2002 | Dunn ............................ | 96/62 |
| 6,524,369 B1 | * | 2/2003 | Krigmont ...................... | 95/78 |
| 6,679,940 B1 | * | 1/2004 | Oda .............................. | 96/55 |

FOREIGN PATENT DOCUMENTS

| | | |
|---|---|---|
| KR | 1019990234879 | 9/1999 |
| KR | 1020020069864 | 9/2002 |
| WO | WO 01/19419 | * 3/2001 |

OTHER PUBLICATIONS

U.S. Appl. No. 10/453,519, filed Jun. 4, 2003, Kim et al.

* cited by examiner

*Primary Examiner*—Richard L. Chiesa
(74) *Attorney, Agent, or Firm*—Staas & Halsey LLP

(57)     ABSTRACT

An air purifier has a simply manufactured and assembled ionizer, which increases the charging efficiency for dust particles through maximally increased discharge spaces and prevents electrical accidents. The air purifier includes an ionizer and a collector. The ionizer includes two ground electrode units and at least one discharge electrode, the two ground electrode units each having one or more electrodes, each formed in a hollow semi-cylindrical shape, the two ground electrode units being joined to face each other, the at least one discharge electrode being placed in spaces formed between the hollow semi-cylindrically shaped electrodes of the joined ground electrode units, thus charging dust particles passing through the spaces between the hollow semi-cylindrically shaped electrodes. The collector is electrically charged with a polarity opposite to a polarity of the charged dust particles.

17 Claims, 8 Drawing Sheets

AIR PURIFIER

CROSS-REFERENCE TO RELATED APPLICATIONS

This application claims the benefit of Korean Application No. 2002-82686 filed Dec. 23, 2002, in the Korean Intellectual Property Office, the disclosure of which is incorporated herein by reference.

BACKGROUND OF THE INVENTION

1. Field of the Invention

The present invention relates generally to an air purifier and, more particularly, to an air purifier which includes an electric dust collecting device that electrically charges dust particles in air and collects the charged dust particles.

2. Description of the Related Art

As is well known to those skilled in the art, an air purifier is used to provide purified clean air after dust, bacteria and contaminants in air are eliminated. The air purifier is provided with an electric dust collecting device to collect dust, etc. In the electric dust collecting device, dust particles electrically charged by corona discharge of an ionizer are collected by electrostatic attraction of a collector electrically charged to have a polarity opposite to that of the charged dust particles.

FIG. 1 is a side sectional view of a conventional air purifier. As shown in FIG. 1, the conventional air purifier includes a pre-filter 102, an ionizer 104, a collector 106, a final filter 108, and a fan 110. The pre-filter 102 acts primarily to filter relatively large dust particles. The ionizer 104, which constitutes the electric dust collecting device along with the collector 106, functions to electrically charge the dust particles to bear a positive polarity by corona discharge between a discharge electrode unit 104b and ground electrode units 104a positioned at both sides of the discharge electrode 104b. The collector 106 has a plurality of horizontal partitions 106a bearing a negative polarity. When the positively charged dust particles flow between the horizontal partitions 106a of the collector 106, the dust particles are adsorbed to and collected on the negatively charged horizontal partitions by electrostatic attraction. The final filter 108 functions to filter fine dust or mold not filtered by the collector 106. The fan 10 circulates air by forcibly generating air from the pre-filter 102 to the final filter 108.

In the above-described conventional air purifier, when the discharge electrode unit 104b and the ground electrode units 104a constituting the ionizer 104 are perpendicular to each other, the discharge occurs. However, if plate-shaped ground electrodes are used, discharge spaces are limited to very small spaces, so that some of dust particles, which quickly move along circulating air generated by the fan 110, may not be electrically charged. The dust particles not electrically charged in the ionizer 104 are not collected by the collector 106, so that the filtering burden of the final filter 108, positioned behind the electric dust collecting device, is increased.

SUMMARY OF THE INVENTION

Accordingly, it is an aspect of the present invention to provide an air purifier that has a simply manufactured and assembled ionizer, which increases the charging efficiency for dust particles through maximally increased discharge spaces and prevents electrical accidents.

Additional aspects and/or advantages of the invention will be set forth in part in the description which follows and, in part, will be obvious from the description, or may be learned by practice of the invention.

The foregoing and/or other aspects of the present invention are achieved by providing an air purifier including an ionizer comprising two ground electrode units and one or more discharge electrodes, the two ground electrode units, each having one or more electrodes, each formed to have a hollow semi-cylindrical shape, the two ground electrode units being joined to face each other, the one or more discharge electrodes being placed in spaces formed between the hollow semi-cylindrically shaped electrodes of the joined ground electrode units, thus charging dust particles passing through the spaces between the hollow semi-cylindrically shaped electrodes, and a collector electrically charged to have a polarity opposite to that of the charged dust particles. The ground electrode units are joined to face each other so that inner surfaces of the hollow semi-cylindrically shaped electrodes of a first ground electrode unit face inner surfaces of the hollow semi-cylindrically shaped electrodes of a second ground electrode unit.

The foregoing and/or other aspects of the present invention are achieved by providing an ionizer of an electric dust collection device that includes two ground electrode units, each comprising one or more electrodes, each provided with a plurality of air holes to pass air therethrough and each formed to have a hollow semi-cylindrical shape, the ground electrode units being joined to face each other so that inner surfaces of the hollow semi-cylindrically shaped electrodes of a first ground electrode unit face inner surfaces of the hollow semi-cylindrically shaped electrodes of a second ground electrode unit, and one or more discharge electrodes placed in cylindrically shaped spaces formed between the hollow semi-cylindrically shaped electrodes by joining the two ground electrode units to discharge electricity toward the ground electrodes, wherein the ground electrode units are each manufactured as a single part.

The foregoing and/or other aspects of the present invention are achieved by providing a ground electrode unit of an electric dust collection device to charge dust particles electrically, including a plurality of electrodes, each provided with a plurality of air holes to pass air therethrough, and each formed to have a hollow semi-cylindrical shape, wherein the ground electrode unit is manufactured as a single part by a pressing process using a single plate.

The foregoing and/or other aspects of the present invention are achieved by providing a ground electrode unit of an electric dust collection device to charge dust particles electrically, including a plurality of electrodes, each provided with a plurality of air holes to pass air therethrough and each formed to have a hollow semi-cylindrical shape, wherein the ground electrode unit is manufactured as a single part by a casting process.

BRIEF DESCRIPTION OF THE DRAWINGS

These and/or other aspects and advantages of the invention will become apparent and more readily appreciated from the following description of the preferred embodiments, taken in conjunction with the accompanying drawings of which: invention will become more apparent by describing, in detail, preferred embodiments thereof with reference to taken in conjunction with the attached drawings in which.

DETAILED DESCRIPTION OF THE PREFERRED EMBODIMENTS

Figure 1:
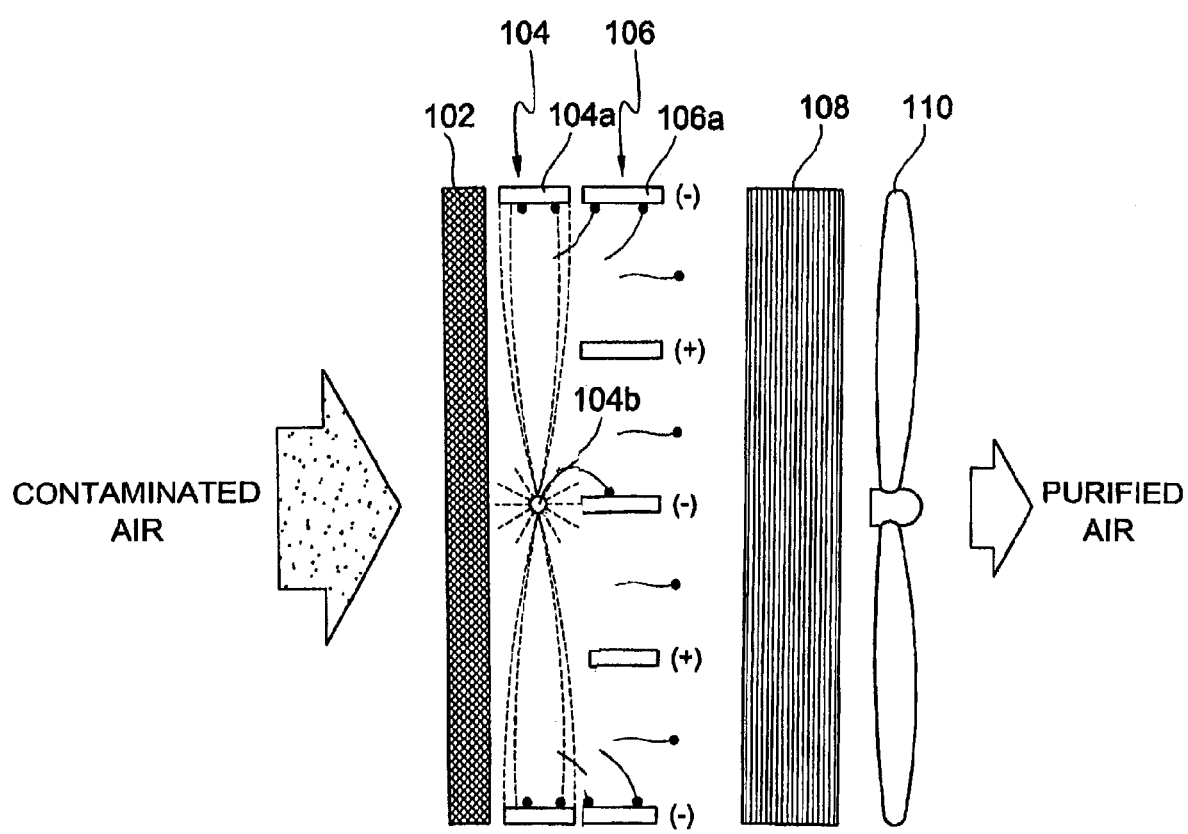
FIG. 1 is a side sectional view of a conventional air purifier.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
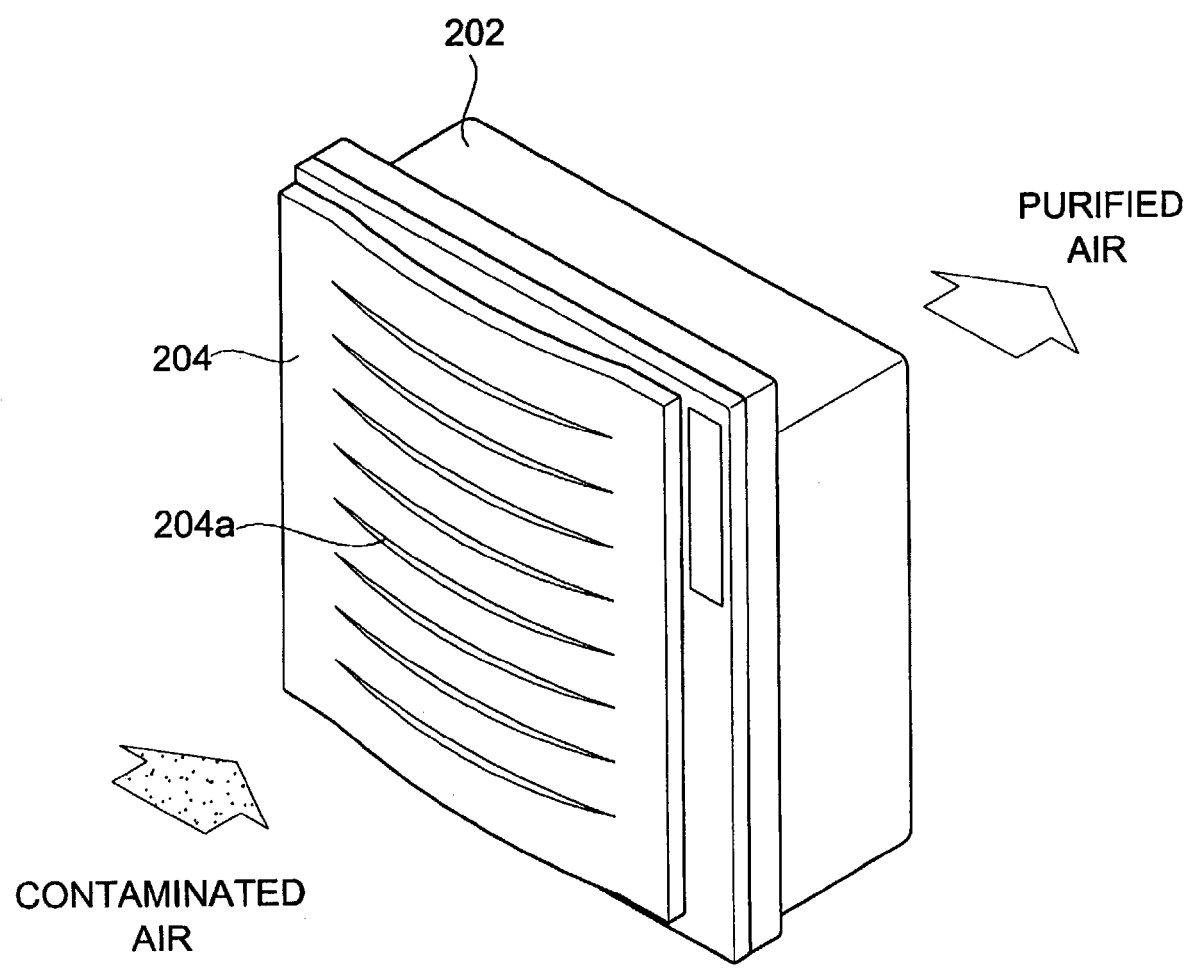
FIG. 2 is a perspective view of an air purifier, according to an embodiment of the present invention.

Embodiments of an air purifier according to the present invention are described in detail with reference to FIGS. 2 to 6. FIG. 2 is a perspective view of an air purifier, according to the present invention. As shown in FIG. 2, a main body 202 of the air purifier is equipped with a cover 204 at a front thereof, which is provided with a plurality of air suction slits 204a so that external air is sucked into the main body 202. That is, through the air suction slits 204a, air including contaminated materials is sucked into the main body 202, such that the main body 202 functions to remove the contaminated materials, such as dust particles, thus purifying the air. The purified air is discharged through an air exhaust port (not shown) positioned at a back of the main body 202 to an outside.

Figure 3:
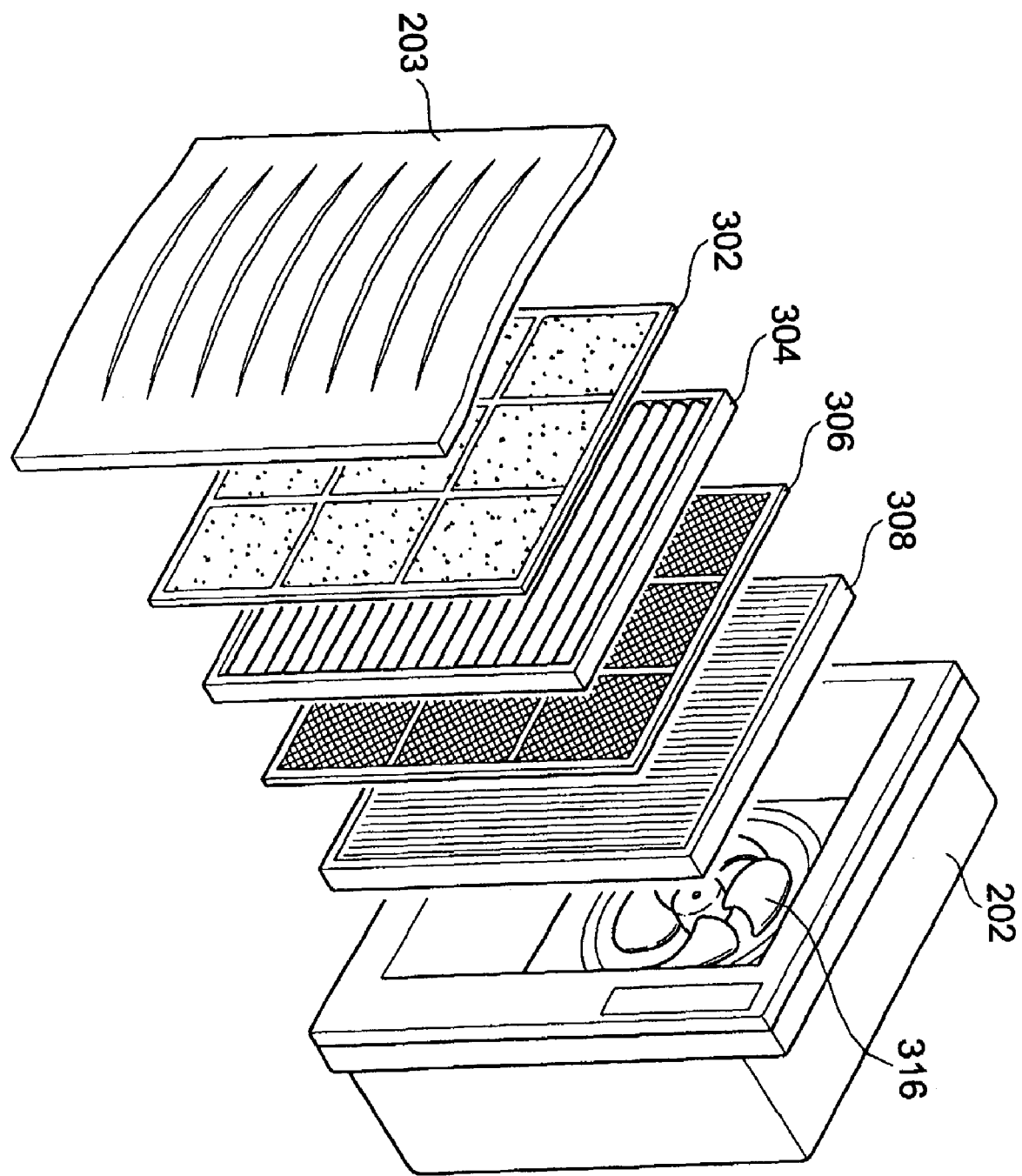
FIG. 3 is an exploded perspective view of the air purifier of FIG. 2.

FIG. 3 is an exploded perspective view of the air purifier of FIG. 2, according to the present invention. As shown in FIG. 3, the air purifier of the present invention includes a pre-filter 302, an ionizer 304, a collector 306, and a HEPA (High Efficiency Particulate Air) filter 308, sequentially disposed from the front to the back of the main body 202 thereof. Further, a fan 316 is equipped at the very rear of the main body 202 to forcibly circulate air from the front to the back of the main body 202. While the fan 316 is rotated, air flows from the front 203 to the back of the main body 202, so that room air is circulated through the air purifier.

Each filter and an electric dust collecting device shown in FIG. 3 function as described below. The pre-filter 302 is used primarily to filter relatively large dust particles. The ionizer 304 and the collector 306 serve as an electric dust collecting device, in which dust particles positively charged in the ionizer 304 are adsorbed to and collected on the negatively charged collector 306 by electrostatic attraction. The dust particles remaining in the air after passing through the collector 306 are filtered by the HEPA filter 308. The HEPA filter is a high-efficiency particulate air filter that is typically at least 99.97% efficient when challenged with 0.3 μm Di-Octyl Phthalate (DOP) particles. The HEPA filter 308 is used to collect microparticulates such as fine dust or bacteria having a very small particle size, wherein the particle size may be as small as the particle size of DOP (Di-Octyl Phthalate) (e.g., about 0.3 μm).

Figure 4A:
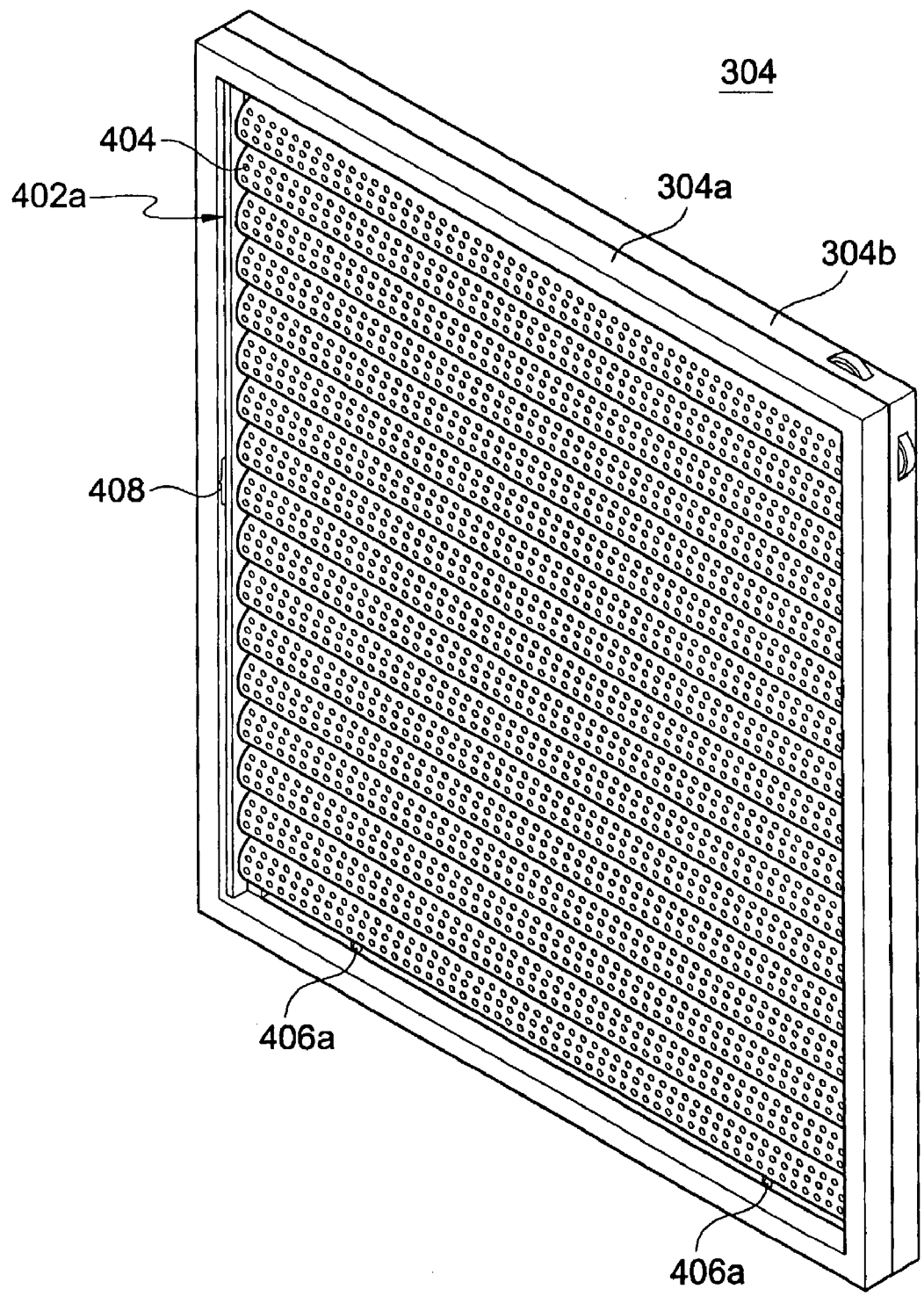
FIG. 4A is a perspective view of an embodiment of an ionizer of the air purifier, according to the present invention.

FIG. 4A is a perspective view of an embodiment of the ionizer of the air purifier, according to the present invention. As shown in FIG. 4A, the ionizer 304 of the present invention includes a ground electrode unit 402a fixedly attached to a lower frame portion 304b. The ground electrode unit 402a includes a plurality of hollow semi-cylindrically shaped electrodes 408, which are arranged successively and in parallel. Additionally, a ground electrode unit 402b (FIG. 4B) includes a plurality of hollow semi-cylindrically shaped electrodes 408, which are arranged successively and in parallel. The number of the electrodes 408 is more than one. In order to increase the charging efficiency for dust particles, the areas of the ground electrode unit 402a and the ground electrode unit 402b are broadened and form a number of electrodes 408. A plurality of air holes 404 are perforated in the surface of each of the ground electrode units 402a and 402b, so that air forcibly blown by the fan 316 is smoothly circulated through the air holes 404. The air holes 404 may be formed in any shape, such as a circle, an ellipse, a polygon and the like, if the shape allows air and dust to pass smoothly therethrough.

Figure 4B:
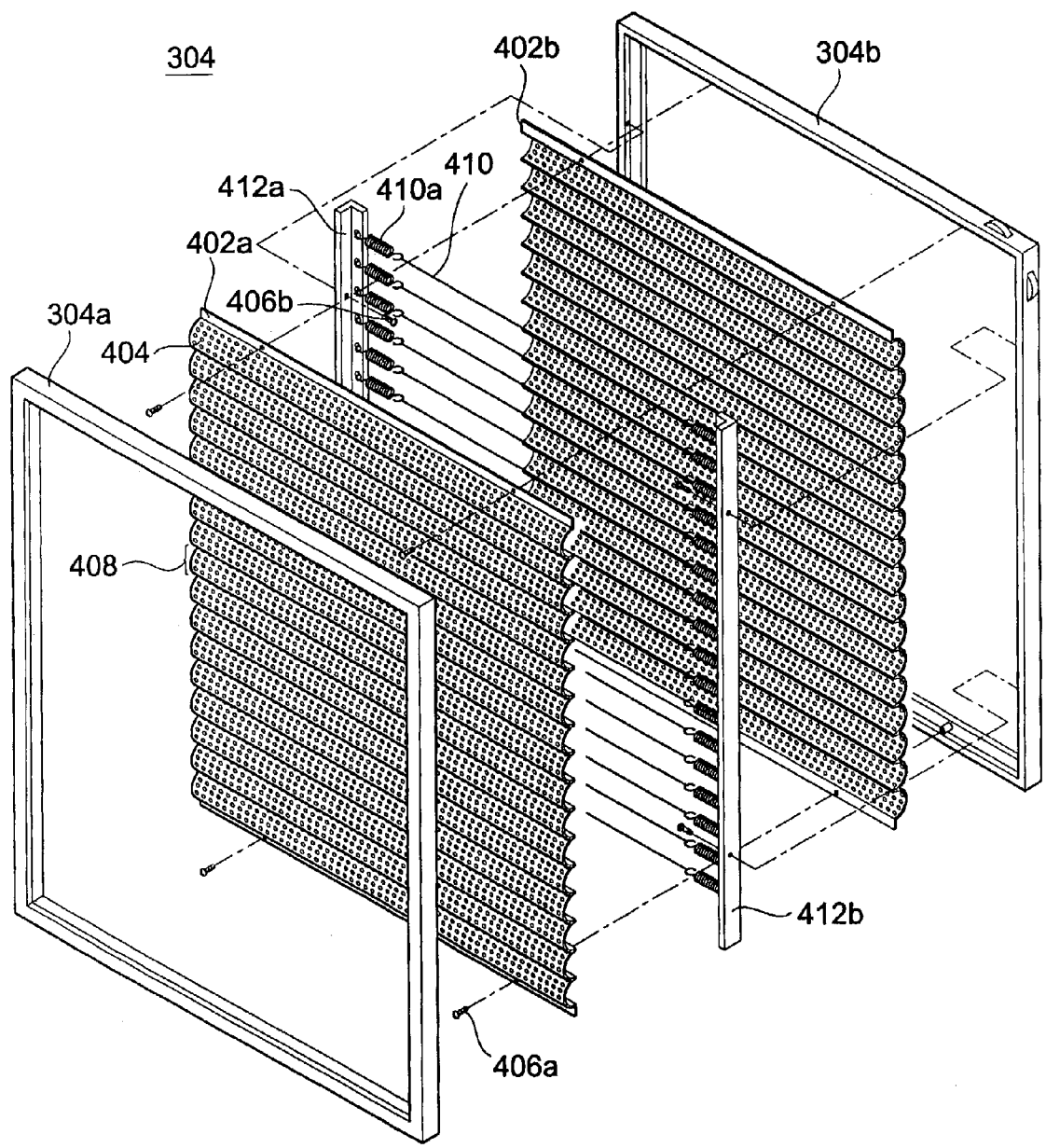
FIG. 4B is an exploded perspective view of the ionizer shown in FIG. 4A.
Figure 4C:
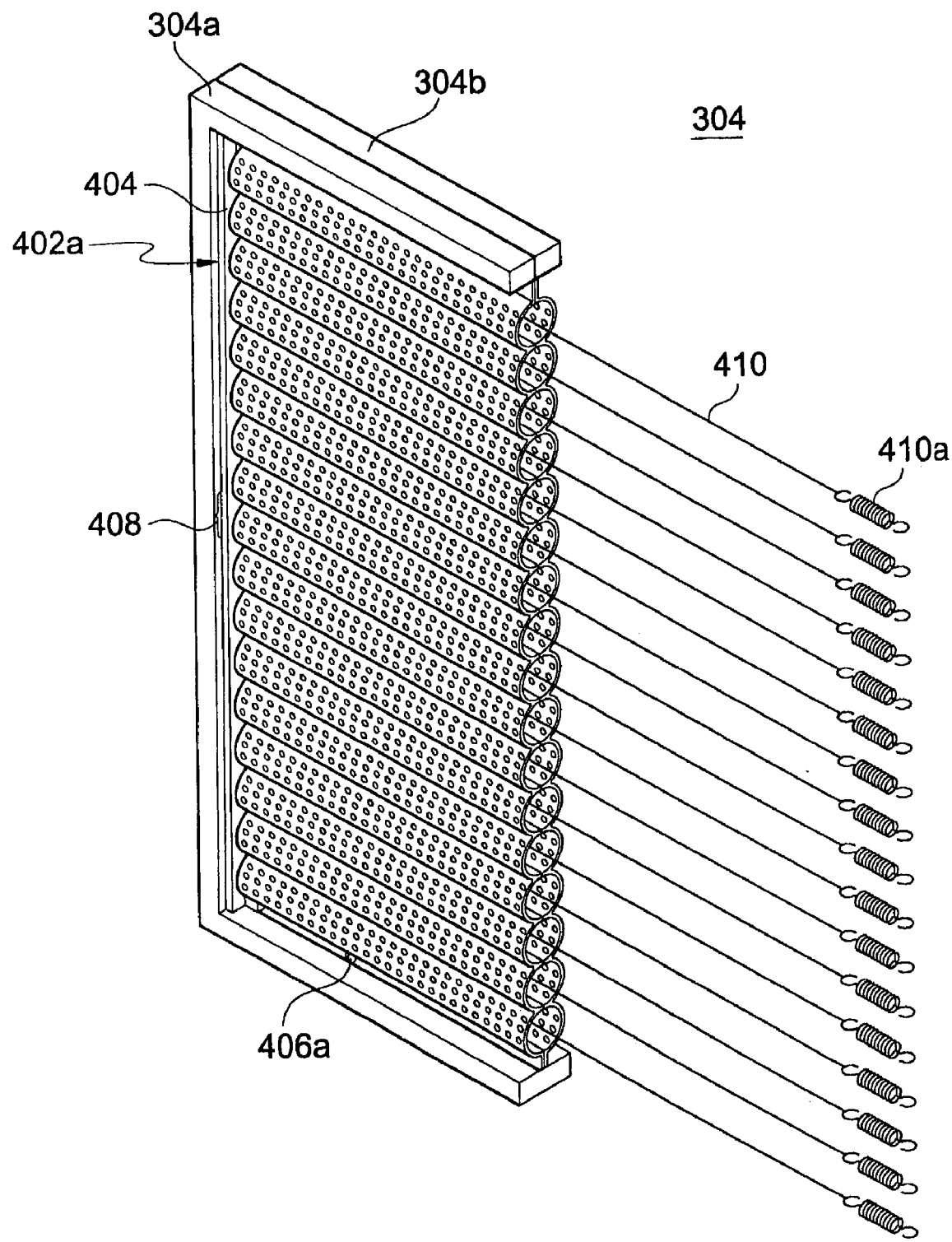
FIG. 4C is a partial view of the ionizer shown in FIG. 4A.

FIG. 4B is an exploded perspective view of the ionizer 304 shown in FIG. 4A. As shown in FIG. 4B, the ionizer 304 of the air purifier of the present invention includes the two ground electrode units 402a and 402b, which are joined to face each other using fastening members 406a, such as screws. The electrodes 408 constituting each of the ground electrode units 402a and 402b are each formed in a hollow semi-cylindrical shape. Accordingly, when the two ground electrode units 402a and 402b are joined to face each other, a plurality of cylindrically shaped spaces are formed by joining the electrodes 408 of the ground electrode unit 402a and the electrodes 408 of the ground electrode unit 402b.

Discharge electrodes 410 made of tungsten wires are disposed at certain intervals inside a frame having an upper frame portion 304a and a lower frame portion 304b. First sides of the discharge electrodes 410 are fixedly connected to a support bracket 412a through springs 410a, which are elastic members, and second sides of the discharge electrodes 410 are fixedly connected to a support bracket 412b through springs 410a, which are elastic members, thus having a certain tension. The support brackets 412a and 412b are fixedly attached to the lower frame portion 304b using fastening members 406b, such as screws. The intervals of the electrodes 410 are proportional to those of the electrodes 408 of the ground electrode units 402a and 402b. The discharge electrodes 410 are fixedly disposed inside the lower frame portion 304b and are positioned in the cylindrically shaped spaces formed by joining the electrodes 408 to face each other. The discharge electrodes 410 are generally positioned on the central axes of the cylindrically shaped spaces formed by joining the electrodes 408 to face each other. If the discharge electrodes 410 are positioned on the central axes of the cylindrically shaped spaces formed by joining the electrodes 408 to face each other, all the tangent planes of the inner surface of each of the electrodes 408 are perpendicular to a corresponding discharge electrode 410. Accordingly, discharge spaces among the discharge electrodes 410 and the ground electrode units 402a and 402b are greatly increased, so that the charging efficiency for dust particles may be maximized.

Figure 5:
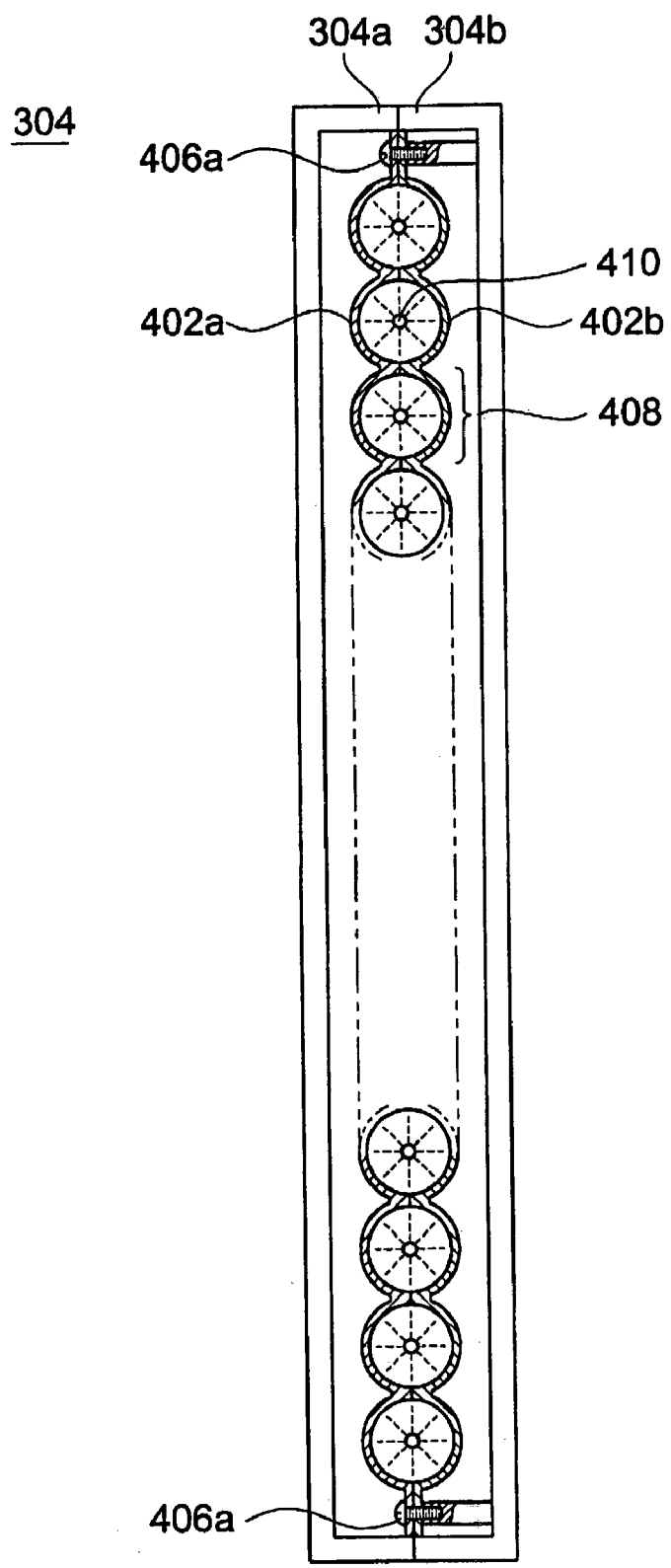
FIG. 5 is a side sectional view of the ionizer of the air purifier shown in FIG. 3, according to the present invention.
Figure 6:
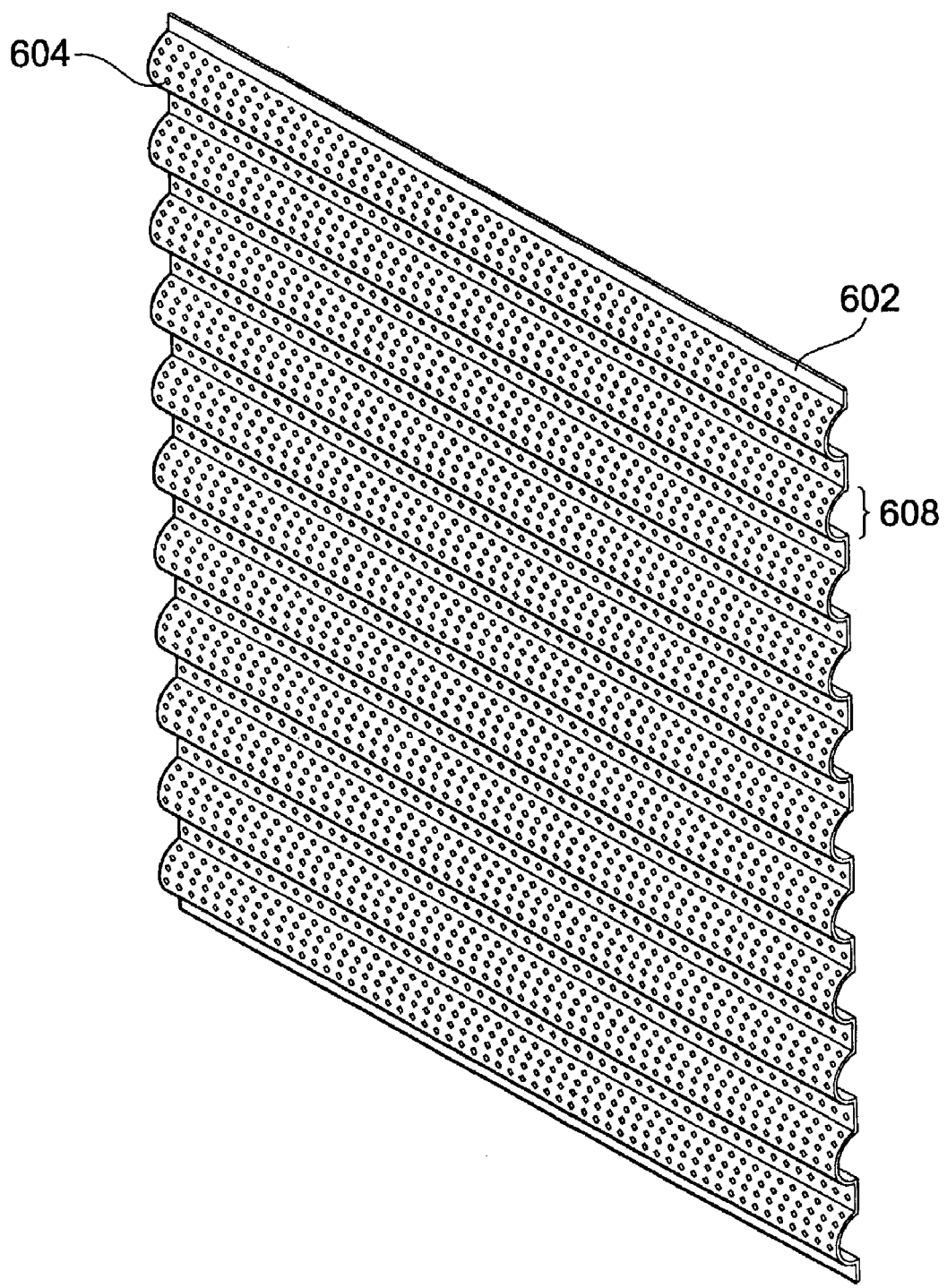
FIG. 6 shows an illustration of a ground electrode unit of the ionizer of the air purifier, according to another embodiment of the present invention.

FIG. 5 is a side sectional view of an embodiment of the ionizer of the air purifier shown in FIG. 3, according to the present invention. As shown in FIG. 5, the discharge electrodes 410 are fixedly positioned on the central axes of the cylindrically shaped spaces formed by joining the electrodes 408 to face each other when the two ground electrode units 402a and 402b, each having the plurality of electrodes 408, are joined to face each other, so that discharge occurs in most of the cylindrically shaped spaces. While dust particles pass through the air holes 404 perforated in the surfaces of the ground electrode units 402a and 402b, the dust particles are positively charged in maximized charging spaces. As described above, the charging spaces of the ionizer 304 of the air purifier according to the present invention are maximized, so that the charging efficiency for the dust particles is greatly increased. FIG. 6 shows a ground electrode unit of the ionizer of the air purifier, according to another embodiment of the present invention. As shown in FIG. 6, in a ground electrode unit 602, a plurality of electrodes 608 are formed spaced apart from each other by a certain interval, and air holes 604 are each formed in a rectangular shape.

During the manufacture of the ground electrode units of the ionizer according to the present invention, the manufacture and assembly processes of the ground electrode units are simplified because a plurality of the electrodes constituting each of the ground electrode units are formed as a single plate. That is, if the air holes are perforated in the single plate by a pressing process and the hollow semi-cylindrically shaped electrodes are formed by bending the perforated plate, the manufacture and assembly processes of the ground electrode units are simplified compared to a case where a plurality of hollow cylindrically shaped electrodes are individually manufactured and assembled with each other. Additionally, if the air holes and the hollow semi-cylindrically shaped electrodes are formed as a single part by a casting process, the manufacture and assembly processes of the ground electrode units are simplified compared to a case where a plurality of hollow cylindrically shaped electrodes are individually manufactured and assembled with each other.

Additionally, the life of the filters positioned behind the electric dust collecting device may be increased due to the increased charging efficiency for dust particles in the ionizer of the air purifier according to an embodiment of the present invention. That is, the charging efficiency for dust particles in the ionizer 304 is greatly increased and the collection performance of the collector 306 is also increased, so that a filtering burden of a filter, for example, the HEPA filter 308, positioned behind the collector 306 may be reduced. A HEPA filter is generally positioned behind the electric dust collecting device to collect fine dust particles, mold and the like. Compared to the other filters, it is difficult to provide the HEPA filter with a microstructure necessary for filtering the microparticulates, thus increasing the manufacturing cost thereof. Accordingly, if the charging efficiency for dust particles in the ionizer 304 is greatly increased and more dust particles are therefore collected, the replacement time of the HEPA filter is increased, so that the economic burden of a user may be greatly decreased.

Additionally, although the discharge electrodes 410 break or the discharge electrodes 410 are disconnected from the frame 304a, 304b, the discharge electrodes 410 are not in contact with each other due to the cylindrically shaped spaces formed by joining the ground electrode units 402a and 402b of the ionizer 304, so that electrical accidents resulting from contact between the discharge electrodes 410 may be prevented.

The table below shows test results of the dust collection performance of an embodiment of the air purifier, according to the present invention. The tests followed filter test standards of the American Society of Heating, Refrigerating and Air-conditioning Engineers (ASHRAE). Referring to the table, the total collection efficiency of dust particles, including collection efficiency of dust particles of 0.3 μm, is greatly improved.

| | | Present invention | | | Prior art | | |
|---|---|---|---|---|---|---|---|
| Test | Air flow rate (m/s) | 0.3μ dust collection efficiency (%) | Total collection efficiency (%) | Pressure loss (mm H$_2$O) | 0.3 μm dust collection efficiency (%) | Total collection efficiency (%) | Pressure loss (mm H$_2$O) |
| 1 | 0.5 | 98.545 | 98.989 | 0.43 | 47.061 | 52.598 | 0.19 |
|   | 1.0 | 71.894 | 79.748 | 1.20 | 24.599 | 27.498 | 0.48 |
|   | 1.5 | 50.456 | 57.383 | 2.34 | 10.273 | 11.028 | 0.83 |
| 2 | 0.5 | 96.490 | 97.795 | 0.51 | 46.723 | 52.585 | 0.18 |
|   | 1.0 | 67.806 | 75.657 | 1.31 | 28.620 | 30.274 | 0.46 |
|   | 1.5 | 49.851 | 56.324 | 2.43 | 8.569 | 8.939 | 0.82 |

As is apparent from the above description, the present invention provides an air purifier that has a simply manufactured and assembled ionizer, which increases the charging efficiency for dust particles through maximally increased discharge spaces and prevents electrical accidents.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An air purifier, comprising:
    an ionizer comprising two ground electrode units and at least one discharge electrode, the two ground electrode units each having at least one electrode, each electrode formed in a hollow semi-cylindrical shape, the two ground electrode units being joined to face each other, the at least one discharge electrode being placed in spaces formed between the hollow semi-cylindrically shaped electrodes of the joined ground electrode units, to charge dust particles passing through the spaces between the hollow semi-cylindrically shaped electrodes; and
    a collector electrically charged to have a polarity opposite to a polarity of the charged dust particles.

2. The air purifier as set forth in claim 1, wherein the ground electrode units are joined to face each other so that inner surfaces of the hollow semi-cylindrically shaped electrodes of a first one of the ground electrode units face inner surfaces of the hollow semi-cylindrically shaped electrodes of a second one of the ground electrode units.

3. The air purifier as set forth in claim 1, wherein distances between an inner surface of each of the hollow semi-cylindrically shaped electrodes and a corresponding one of the discharge electrodes are uniform.

4. The air purifier as set forth in claim 1, wherein the ground electrode units are provided with a plurality of air holes to allow air to pass therethrough.

5. The air purifier as set forth in claim 1, wherein the ground electrode units are each manufactured as a single part by a pressing process using a single plate.

6. The air purifier as set forth in claim 1, wherein the ground electrode units are each manufactured as a single part by a casting process.

7. The air purifier of claim 1, further including a High Efficiency Particulate Air (HEPA) filter arranged to filter microparticulate particles following passage of air through the collector.

8. An ionizer of an electric dust collection device, comprising:
  two ground electrode units, each comprising at least one electrode, each provided with a plurality of air holes to pass air therethrough and each formed with a hollow semi-cylindrical shape, the ground electrode units being joined to face each other so that inner surfaces of the hollow semi-cylindrically shaped electrodes of a first one of the ground electrode units face inner surfaces of the hollow semi-cylindrically shaped electrodes of a second one of the ground electrode units; and
  at least one discharge electrode placed in cylindrically shaped spaces formed between the hollow semi-cylindrically shaped electrodes by joining the two ground electrode units to discharge electricity toward the ground electrodes;
  wherein the ground electrode units are each manufactured as a single part.

9. The ionizer as set forth in claim 8, wherein the ground electrode units are each manufactured as a single part by a pressing process using a single plate.

10. The ionizer as set forth in claim 8, wherein the ground electrode units are each manufactured as a single part by a casting process.

11. A method of purifying air, comprising:
  passing the air through an ionizer comprising two ground electrode units and at least one discharge electrode, the two ground electrode units each having at least one electrode, each electrode formed in a hollow semi-cylindrical shape, the two ground electrode units being joined to face each other, the at least one discharge electrode being placed in spaces formed between the hollow semi-cylindrically shaped electrodes of the joined ground electrode units, to charge dust particles passing through the spaces between the hollow semi-cylindrically shaped electrodes; and
  passing the air through a collector electrically charged to have a polarity opposite to a polarity of the charged dust particles to collect the charged dust particles.

12. The method of claim 11, wherein the ground electrode units are joined to face each other so that inner surfaces of the hollow semi-cylindrically shaped electrodes of a first one of the ground electrode units face inner surfaces of the hollow semi-cylindrically shaped electrodes of a second one of the ground electrode units.

13. The method of claim 11, wherein distances between an inner surface of each of the hollow semi-cylindrically shaped electrodes and a corresponding one of the discharge electrodes are uniform.

14. The method of claim 11, wherein the ground electrode units are provided with a plurality of air holes to allow the air to pass therethrough.

15. The method of claim 11, wherein the ground electrode units are each manufactured as a single part by a pressing process using a single plate.

16. The method of claim 11, wherein the ground electrode units are each manufactured as a single part by a casting process.

17. The method of claim 11, further including passing the air through a High Efficiency Particulate Air (HEPA) filter to filter microparticulate particles following passage of the air through the collector.

* * * * *